United States Patent
Fochtman et al.

(10) Patent No.: US 6,508,418 B1
(45) Date of Patent: *Jan. 21, 2003

(54) CONTAMINANT TOLERANT COMPRESSED NATURAL GAS INJECTOR AND METHOD OF DIRECTING GASEOUS FUEL THERETHROUGH

(75) Inventors: James Paul Fochtman, Williamsburg, VA (US); Danny Orlen Wright, Cobb's Creek, VA (US); James H. Cohen, Virginia Beach, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/320,178

(22) Filed: May 26, 1999

Related U.S. Application Data

(60) Provisional application No. 60/086,937, filed on May 27, 1998, and provisional application No. 60/086,939, filed on May 27, 1998.

(51) Int. Cl.$^7$ .................................................. B05B 1/30
(52) U.S. Cl. ............................ 239/585.4; 251/129.21; 123/472
(58) Field of Search ................ 123/472; 239/585.4, 239/585.5, 585.1, 585.2, 585, 3; 251/129.15, 129.21

(56) References Cited

U.S. PATENT DOCUMENTS

| | | | |
|---|---|---|---|
| 2,291,968 A | 8/1942 | Keffe | 175/336 |
| 3,662,987 A | 5/1972 | Schlagmuller et al. | 251/139 |
| 3,731,881 A | 5/1973 | Dixon et al. | 239/585 |
| 3,937,855 A | 2/1976 | Gruenwald | 427/54 |
| 4,331,317 A | 5/1982 | Kamai et al. | 251/139 |
| 4,586,017 A | 4/1986 | Laskaris et al. | 338/32 S |
| 4,634,055 A * | 1/1987 | Hans et al. | 239/533.3 |
| 4,662,567 A | 5/1987 | Knapp | 239/585 |
| 4,688,723 A | 8/1987 | Kern et al. | 239/391 |

(List continued on next page.)

FOREIGN PATENT DOCUMENTS

| | | | |
|---|---|---|---|
| DE | 19638201 A | * | 9/1996 |
| GB | 2044 986 | | 10/1980 |

Primary Examiner—Carl S. Miller

(57) ABSTRACT

An electromagnetically actuable fuel injector for an internal combustion engine is disclosed having an outer housing, a fuel inlet connector positioned in the upper end portion of the outer housing for reception of fuel therein, and an armature having a valve needle attached thereto and positioned adjacent the fuel inlet connector and spaced therefrom by a working gap. The armature defines a generally elongated central opening to receive fuel flow from the fuel inlet connector and has valve needle attached thereto which interacts with a fixed valve having a fixed valve seat associated with the housing to selectively permit fuel to flow through a valve aperture associated with the fixed valve seat. The fuel inlet connector has a fuel outlet end facing a fuel inlet end of the armature and includes a plurality of radially extending raised pads separated by a corresponding plurality of radially extending recessed portions to reduce the contact area between the fuel inlet connector and the armature when the armature is moved upwardly, and to promote fuel flow transversely across the working gap therebetween to establish a first fuel flow path outside of the armature. The first fuel flow path prevents contaminants from accumulating in the working gap. The armature includes at least one first aperture extending through a wall portion thereof for receiving fuel flow from the generally elongated central opening and for directing the fuel flow to a second flow path toward the fixed valve seat. At least one-second aperture extends through a wall portion of the armature and extends at a generally acute angle relative to the longitudinal axis to establish a third fuel flow path toward the fixed valve seat. The size, orientation and numbers of the apertures can be varied to achieve predetermined flow conditions. A method of directing fuel through an injector is also disclosed although the fuel injector and method disclosed utilize gaseous fuels, all types of fuels are contemplated.

29 Claims, 9 Drawing Sheets

U.S. PATENT DOCUMENTS

| | | | | |
|---|---|---|---|---|
| 4,693,227 A | | 9/1987 | Satou | 123/575 |
| 4,783,009 A | | 11/1988 | Coates | 239/580 |
| 4,909,447 A | * | 3/1990 | Gallup et al. | 239/585 |
| 4,922,862 A | | 5/1990 | Casacci | 123/1 A |
| 4,946,107 A | * | 8/1990 | Hunt | 239/585 |
| 4,978,074 A | | 12/1990 | Weinand | 239/585 |
| 4,984,744 A | * | 1/1991 | Babitzka | 239/585 |
| 4,988,967 A | | 1/1991 | Miller et al. | 335/279 |
| 5,025,554 A | | 6/1991 | Dohi | 29/860 |
| 5,033,716 A | | 7/1991 | Mesenich | 251/129.21 |
| 5,035,360 A | | 7/1991 | Green et al. | 239/585 |
| 5,046,472 A | | 9/1991 | Linder | 123/533 |
| 5,092,305 A | | 3/1992 | King | 123/575 |
| 5,127,585 A | | 7/1992 | Mesenich | 239/585.5 |
| 5,129,381 A | | 7/1992 | Nakajima | 123/531 |
| 5,131,599 A | * | 7/1992 | Maier | 239/585.4 |
| 5,174,505 A | | 12/1992 | Shen | 239/417.3 |
| 5,209,408 A | * | 5/1993 | Reiter | 239/585.4 |
| 5,232,167 A | * | 8/1993 | McCormick et al. | 239/585.5 |
| 5,301,874 A | | 4/1994 | Vogt et al. | 239/585.4 |
| 5,341,994 A | | 8/1994 | Wakeman | 239/585.5 |
| 5,344,081 A | | 9/1994 | Wakeman | 239/585.4 |
| 5,373,992 A | * | 12/1994 | Reiter | 239/585.4 |
| 5,381,966 A | | 1/1995 | Gernert, II | 239/585.3 |
| 5,383,606 A | | 1/1995 | Stegmaier et al. | 239/575 |
| 5,392,995 A | * | 2/1995 | Wahba | 239/585.4 |
| 5,494,223 A | | 2/1996 | Hall et al. | 251/129.21 |
| 5,494,224 A | | 2/1996 | Hall et al. | 239/585.5 |
| 5,529,387 A | * | 6/1996 | Mialkowski | 251/30.03 |
| 5,544,816 A | * | 8/1996 | Nally et al. | 239/585.5 |
| 5,566,920 A | * | 10/1996 | Romann et al. | 251/129.21 |
| 5,609,304 A | | 3/1997 | Sasao | 239/585.4 |
| 5,613,640 A | | 3/1997 | Furuya et al. | 239/585.5 |
| 5,628,294 A | | 5/1997 | Krieckaert et al. | 123/525 |
| 5,632,467 A | | 5/1997 | Just et al. | 251/129.21 |
| 5,678,767 A | | 10/1997 | Rahbar | 239/533.2 |
| 5,687,698 A | * | 11/1997 | Mastro et al. | 123/571 |
| 5,704,553 A | | 1/1998 | Wieczorek et al. | 239/585.1 |
| 5,730,367 A | | 3/1998 | Pace et al. | 239/408 |
| 5,735,253 A | | 4/1998 | Perotto et al. | 173/575 |
| 5,755,211 A | * | 5/1998 | Koch | 123/525 |
| 5,758,865 A | | 6/1998 | Casey | 251/129.21 |
| 5,785,251 A | | 7/1998 | Wood et al. | 239/417.3 |
| 5,794,860 A | | 8/1998 | Neumann | 239/585.3 |
| 5,860,601 A | | 1/1999 | Egizi | 239/533.12 |
| 5,915,626 A | | 6/1999 | Awarzmani et al. | 239/135 |
| 5,918,818 A | | 7/1999 | Takeda | 239/585.1 |
| 5,921,475 A | | 7/1999 | DeVriese et al. | 239/585.4 |
| 5,927,613 A | | 7/1999 | Koyanagi et al. | 239/585.1 |
| 5,996,911 A | * | 12/1999 | Gesk et al. | 239/585.1 |
| 5,996,912 A | | 12/1999 | Ren et al. | 239/585.5 |
| 6,000,628 A | | 12/1999 | Lorraine | 239/587.1 |
| 6,003,791 A | | 12/1999 | Reiter | 239/575 |
| 6,027,050 A | | 2/2000 | Rembold et al. | 239/585.5 |
| 6,032,879 A | * | 3/2000 | Hamada et al. | 239/585.1 |
| 6,076,802 A | * | 6/2000 | Maier | 251/129.21 |
| 6,079,642 A | * | 6/2000 | Maier | 239/585.1 |
| 6,089,467 A | * | 7/2000 | Fochtman et al. | 239/5 |
| 6,102,303 A | * | 8/2000 | Bright et al. | 251/129.21 |
| 6,328,231 B1 | | 12/2001 | Ording et al. | 239/585.1 |
| 6,334,580 B2 | | 1/2002 | Cohen et al. | 239/585.1 |
| 2001/0173626 | | 8/2001 | Fochtman et al. | 239/585.1 |

* cited by examiner

CONTAMINANT TOLERANT COMPRESSED NATURAL GAS INJECTOR AND METHOD OF DIRECTING GASEOUS FUEL THERETHROUGH

CROSS-REFERENCE TO RELATED APPLICATION

This application expressly claims the benefit of earlier filing date and right of priority from the following co-pending patent applications: U.S. Provisional Application U.S. Serial No. 60/086,937, entitled "Contaminant Tolerant Compressed Natural Gas Injector" filed May 27, 1998; and U.S. Provisional Application U.S. Serial No. 60/086,939, entitled "Needle Valve For Low Noise Fuel Injector" filed May 27, 1998. Both cited provisional patent applications are expressly incorporated in their entirety by reference.

BACKGROUND OF THE INVENTION

1. Field of the Invention

The present application relates to a compressed natural gas injector, which is tolerant of contamination in the gas.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to help reduce the effects of contaminants in the fuel.

Compressed natural gas is delivered throughout the country in a pipeline system and is mainly used for commercial and residential heating. While the heating systems can tolerate varying levels of quality and contaminants in the CNG, the tolerance levels in automotive gas injectors are significantly lower.

These contaminants, which have been acceptable for many years in CNG used for heating, affect the performance of the injectors to varying levels and will need to be considered in future CNG injector designs. Some of the contaminants found in CNG are small solid particles, water, and compressor oil. Each of these contaminants needs to be addressed in the injector design for the performance to be maintained over the life of the injector.

The contaminants can enter the pipeline from several sources. Repair, maintenance and new construction to the pipeline system can introduce many foreign particles into the fuel. Water, dust, humidity and dirt can be introduced in small quantities with ease during any of these operations. Oxides of many of the metal types found in the pipeline can also be introduced into the system. In addition, faulty compressors can introduce vaporized compressor oils, which blow by the seals of the compressor and enter into the gas. Even refueling can force contaminants on either of the refueling fittings into the storage cylinder. Many of these contaminants are likely to reach vital fuel system components and alter the performance characteristics over the life of the vehicle.

In general, fuel injectors require extremely tight tolerances on many of the internal components to accurately meter the fuel. For CNG injectors to remain contaminant tolerant, the guide and impact surfaces for the armature needle assembly require certain specifically unique characteristics. We have invented a CNG fuel injector which represents a significant improvement over presently known injectors while being tolerant to contaminants commonly found in compressed natural gas. We have also invented a method of directing compressed natural gaseous fuel through such injectors in a manner to promote efficient and effective firing without misfire.

SUMMARY OF THE INVENTION

The invention relates to an electromagnetically operable fuel injector for a gaseous fuel injection system of an internal combustion engine, the injector having a generally longitudinal axis, which comprises a ferromagnetic core, a magnetic coil at least partially surrounding the ferromagnetic core, an armature magnetically coupled to the magnetic coil and being movably responsive to the magnetic coil, the armature actuating a valve closing element which interacts with a fixed valve seat of a fuel valve and being movable away from the fixed valve seat when the magnetic coil is excited. The armature has a generally elongated shape and a generally central opening for axial reception and passage of gaseous fuel from a fuel inlet connector positioned adjacent thereto. The fuel inlet connector and the armature being adapted to permit a first flow path of gaseous fuel between the armature and the magnetic coil and a valve body shell as part of a path leading to the fuel valve. At least one first fuel flow aperture extends through a wall portion of the armature to define a second flow path of gaseous fuel as part of a path leading to the fuel valve.

In the preferred embodiment, the armature defines at least one-second aperture in a wall portion thereof to define a third flow path of gaseous fuel as part of a path leading to the fuel valve. The at least one second aperture is oriented at a generally acute angle with respect to the longitudinal axis. Further, the fuel inlet connector and the armature are a spaced to define a working gap therebetween and are adapted to permit the first flow path of gaseous fuel within the working gap. The fuel injector further comprises a valve body positioned downstream of the armature and having at least one aperture in a wall portion thereof for reception of fuel from at least two of the flow paths of gaseous fuel from the armature and the fuel inlet connector.

Further, a valve body shell at least partially surrounds the armature and the valve body, the valve body shell defining a radial space with the armature for passage of the first flow path of gaseous fuel between the armature and the valve body shell. The fuel inlet connector is positioned above the armature and is spaced from the armature by a working gap, the fuel inlet connector defining a through passage for directing fuel toward the armature and the fixed valve seat.

The fuel inlet connector comprises an upper end portion adapted for reception of gaseous fuel from a fuel source, and a lower end portion for discharging gaseous fuel, the lower end portion having a lower surface which faces an upper surface of the armature, the lower surface of the fuel inlet connector having a plurality of radially extending raised pads defined thereon, the pads having recessed portions therebetween to permit fuel to flow therethrough and across the working gap defined between the fuel inlet connector and the armature.

The armature defines at least one first and at least one second fuel flow aperture extending through wall portions thereof, the at least one first and at least one second aperture oriented at an acute angle with the longitudinal axis, and positioned for directing fuel therethrough toward the fixed valve seat. The lowermost surface of the fuel inlet connector and the armature are adapted to permit gaseous fuel to flow across the working gap and between the armature and the magnetic coil whereby at least three fuel flow paths are permitted. Preferably lowermost end portion of the fuel inlet connector has a generally chamfered configuration along the lowermost outer surface thereof. The generally chamfered portion of the fuel inlet connector preferably has a generally arcuate cross-section.

The valve-closing element is a valve needle adapted for selective engagement and disengagement with the fixed valve seat and is attached to the armature by crimped portions of the armature. A fuel filter is positioned at an upper end portion of the fuel inlet connector for filtering fuel prior to reception by the fuel inlet connector. The fuel inlet connector includes a lower surface portion having a plurality of radially extending grooves defining a corresponding plurality of radially extending raised pads so as to reduce the effective surface area of the lower surface portion of the fuel inlet connector facing the armature to thereby permit the gaseous fuel to flow generally transversely in the working gap, the transverse fuel flow thereby preventing accumulation of contaminants in the working gap. The generally radially extending pads preferably have a generally trapezoidal shape, but may be of various shapes, depending upon the circumstances or results desired. Further, the fuel injector is applicable to liquid fuel systems such as gasoline, as well as with the preferred CNG systems.

The valve closing element is a generally elongated valve needle having a spherically shaped end portion and configured and adapted to engage a frust-conically shaped fixed valve seat to close the valve, and movable therefrom to open the valve to permit fuel to pass therethrough toward the intake manifold of the internal combination engine. The valve needle is connected to the lower end portion of the armature by crimped portions. The resilient device to move the armature to close the valve is a coil spring in engagement at one end with the fuel inlet connector and at the other end with the armature to bias the armature downwardly toward the valve seat. The armature includes at least two of the first apertures extending through wall portions thereof and generally transverse to the longitudinal axis for receiving fuel from the generally axial elongated central opening. The armature may alternatively define a plurality of the first apertures for receiving fuel from said generally axial elongated central opening. The armature may also define a plurality of the second apertures, at least certain of the second apertures extending at a generally acute angle to the longitudinal axis to receive fuel from the generally central opening.

A method is disclosed for directing gaseous fuel through an electromagnetically operable fuel injector for a fuel system of an internal combustion engine, the injector having a generally longitudinal axis, and including a fuel inlet end portion and a fuel outlet end portion, a fuel inlet connector positioned at the fuel inlet end portion and having a fuel inlet end portion and a fuel outlet end portion, an armature positioned adjacent the fuel outlet end portion of the fuel inlet connector and having a generally central elongated opening for reception of fuel from said fuel inlet connector, the armature being spaced from the fuel inlet connector to define a working gap to permit movement of the armature toward and away from the fuel inlet connector to selectively open and close a fuel valve to permit gaseous fuel to pass therethrough to an air intake manifold. The method comprises, directing the gaseous fuel to pass axially through the fuel inlet connector, directing the gaseous fuel to pass from the fuel inlet connector to the generally elongated central opening of the armature in an axial direction toward the fuel valve, directing at least a portion of the fuel flow from the fuel inlet connector to the armature to flow generally transversely across the working gap, and diverting at least a portion of the flow of gaseous fuel passing through the armature to flow in a direction away from the axial direction. The step of directing the gaseous fuel passing through the armature to flow in a direction away from the axial direction is preferably accomplished by directing the gaseous fuel through at least one first aperture provided in a wall portion of the armature. Preferably the at least one first aperture in the wall portion of the armature extends generally transverse to the axial direction. A lower end portion of the fuel inlet connector preferably faces an upper end portion of the armature and is configured to permit the gaseous fuel to flow from the fuel inlet connector to be directed transversely across the working gap. Preferably at least a portion of the gaseous fuel flowing in the armature is permitted to pass through at least one second aperture in a lower wall portion thereof, the at least one second aperture extending at an acute angle to the longitudinal axis, whereby at least three separate fuel flow paths are established. The injector preferably comprises a magnetic coil system and said armature is magnetically coupled to the magnetic coil system to cause the armature to move toward and away from the fuel inlet connector. At least one of the fuel flow paths is located between the armature and the magnetic coil of the magnetic coil system, as well as between the armature and a valve body shell at least partially surrounding the armature. The at least one first and second apertures in the armature are preferably from about 1 to about 2.0 mm in diameter. Further, predetermined numbers of the first and second apertures are provided and the diameters thereof are predetermined to establish a predetermined number of fuel flow paths and volumetric flow rates thereof.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figure 1:
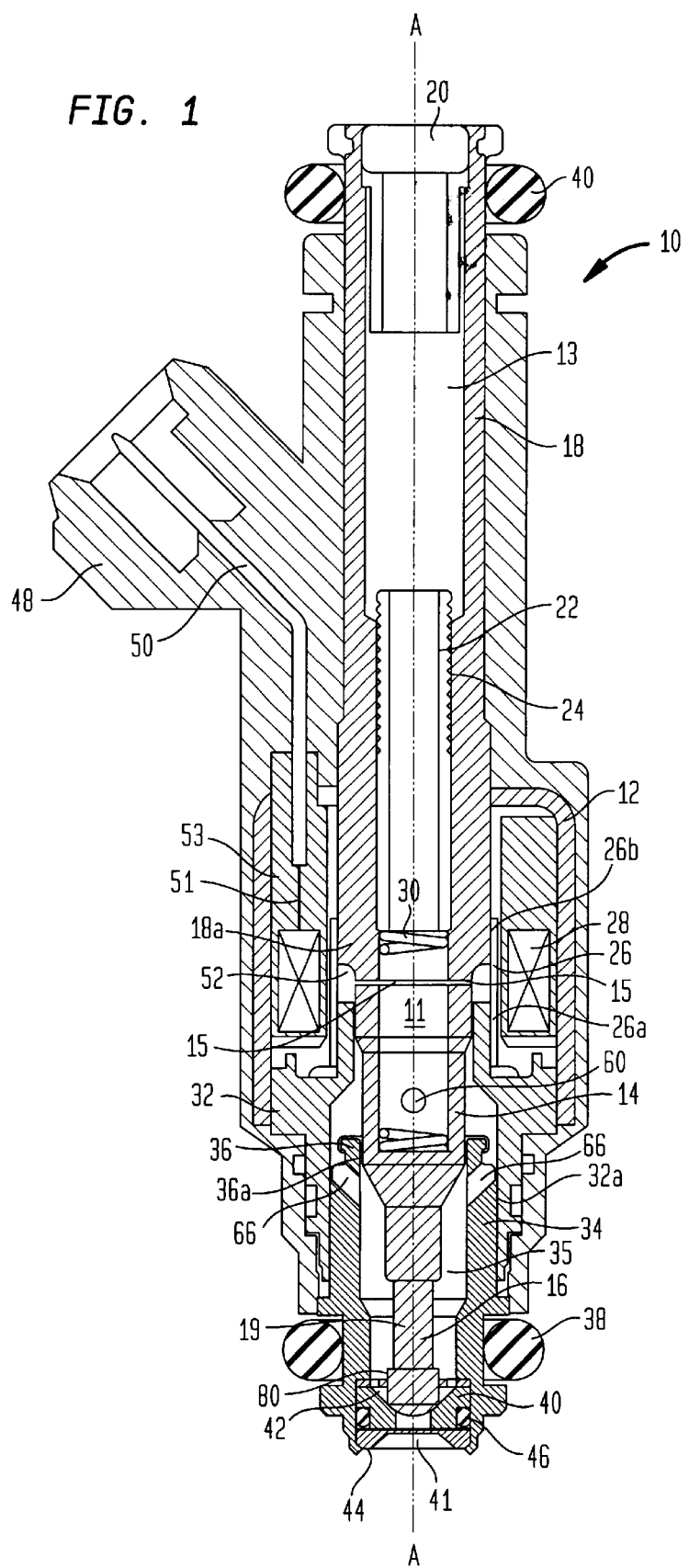
FIG. 1 is an elevational view, partially in cross-section, of a preferred embodiment of a compressed natural gas injector constructed according to the invention.

Referring initially to FIG. 1 there is shown a CNG injector 10 which is constructed according to the present invention. Injectors of the type contemplated herein are described in commonly assigned U.S. Pat. No. 5,494,224, the disclosure of which is incorporated by reference herein.

The injector 10 includes housing 12 containing armature 14 to which valve needle 16 is attached by crimping as will be described later in conjunction with FIG. 12. Fuel inlet connector 18 includes central fuel flow opening 13 and CNG filter 20 at the upper end portion of opening 19 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and inlet connector 18 define with housing 12, an enclosure for coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown).

Figure 2:
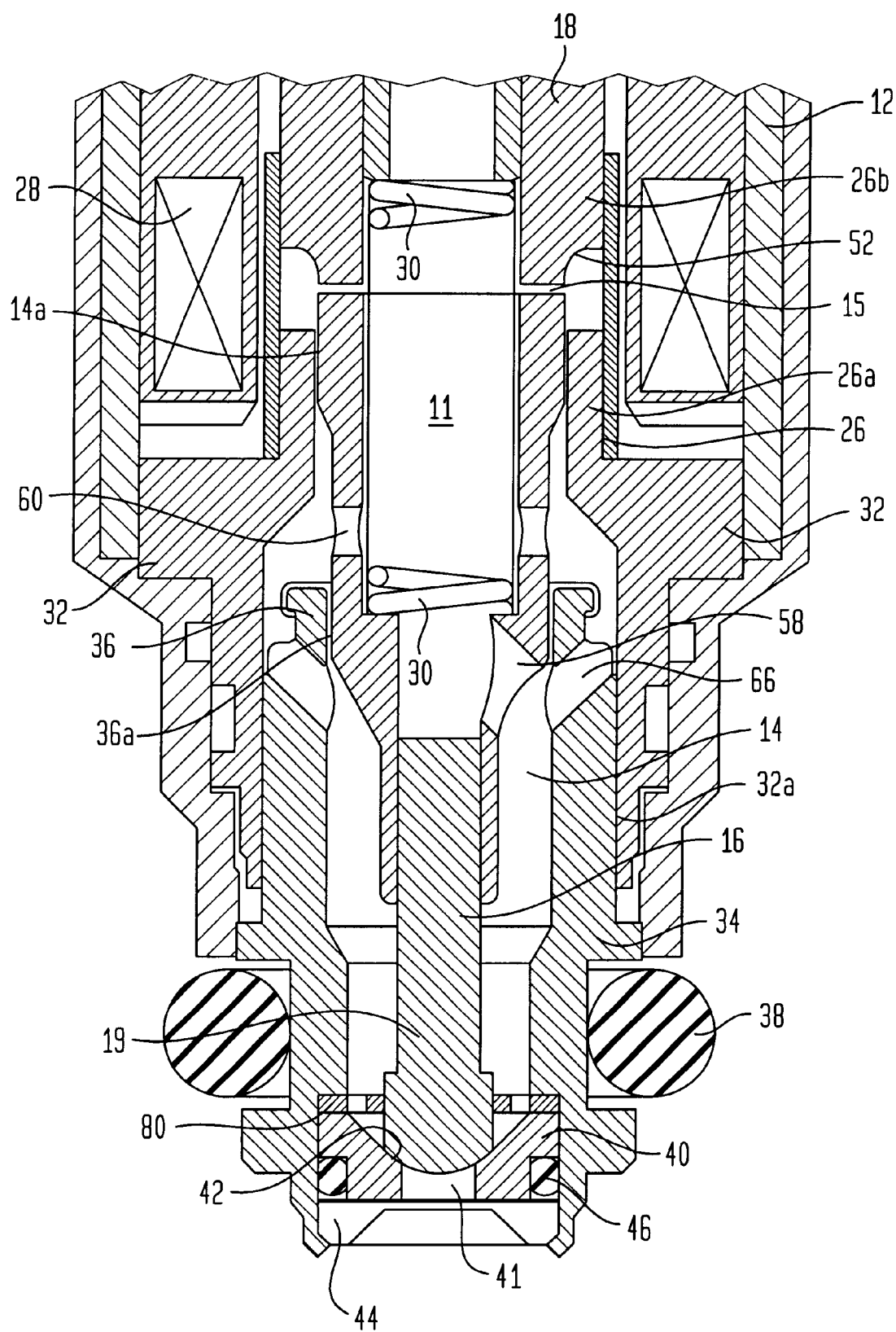
FIG. 2 is an enlarged elevational cross-sectional view of the lower portion of the injector of FIG. 1, showing the improved armature and needle which forms part of the invention.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 40 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector at 26b. Thus, fuel flowing from fuel inlet connector 18 across working gap 15 must flow through the clearance space 14a between armature 14 and valve body shell 32 which is also provided to permit upward and downward movement of armature 14. The space 14a is approximately 0.10 to 0.30 mm on the diameter.

Referring again to FIGS. 1 and 2, valve seat 40 contains a valve orifice 41 and a funnel shaped needle rest 42 having a frusto-conical cross-sectional shape. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Coil 28 is surrounded by dielectric plastic material 53 as shown in the FIGS.

In injectors of this type, the interface space 15 (or working gap 15) between the inlet connector and the armature is extremely small, i.e. in the order of about 0.3 mm (millimeters), and functions relatively satisfactorily with conventional fuels which are relatively free of contaminants such as water, solids, oil, or the like, particularly after passing through a suitable fuel filter. Accordingly, when the two surfaces surrounding space 15 are in such intimate contact that the atmosphere between them is actually displaced in relatively significant amounts, atmospheric pressures acting on the two members actually force the two surfaces together. Any liquid contaminant present at the armature/inlet connector interface would allow for the atmosphere to be displaced, thereby adversely affecting the full and free operation of the armature/needle combination.

When known injectors, which functioned at relatively acceptable levels with relatively clean conventional fuels, were utilized with CNG, impurities such as oil or water at the inlet connector/armature interface produced a force of about 16.5 Newtons holding the armature to the inlet connector. In comparison, the force provided by spring 30 is in the order of about 3 Newtons, thus fully explaining the erratic closing of the armature/valve needle when the fuel utilized with known injectors is CNG. In particular, the 16.5 Newton force holding the inlet connector and armature together is due to the fact that the fuel operating pressure within the injector is about 8 bar (i.e. 8 atmospheres) and this force of about 16.5 Newtons acts across the lower surface area of the inlet connector 18, which is about 21 square millimeters (i.e. $mm^2$). Thus a relatively minor slick of oil or other impurity within space 15 of a known injector will cause the inlet connector and the armature to become temporarily attached to each other, particularly due to the 8 bar pressure acting on the remaining surfaces of the inlet connector and armature. As noted, the tendency for the armature to become attached to the inlet connector results in erratic valve closing.

Figure 3:
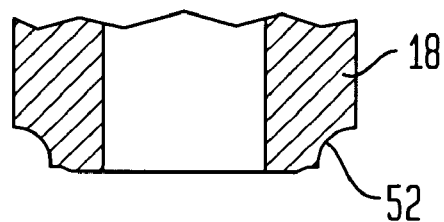
FIG. 3 is a partial elevational cross-sectional view of the lower end portion of the fuel inlet connector of the injector shown in FIG. 1.

Significant features of the present invention are provided inter alia, to eliminate the aforementioned erratic valve closing and improve the operation of the injector. In FIG. 3, the lower end portion of inlet connector 18 is configured as shown by the arcuately chamfered end 52. This configuration provides a beneficial effect in that it directs and orients the magnetic field across the working gap 15 in a manner which optimizes the useful magnetic force created for moving the armature through the working gap. This feature is disclosed in commonly assigned, commonly filed (Attorney Docket No. 99P7609US) application entitled "Compressed Natural Gas Fuel Injector Having Magnetic Pole Face Flux Director," the disclosure of which is incorporated herein by reference. Additional features are disclosed in commonly assigned, commonly filed (Attorney Docket No. 99P7610US) copending application entitled "Compressed Natural Gas Injector having Gaseous Dampening for Armature Needle Assembly during Opening," the disclosure of which is incorporated herein by reference.

Figure 4:
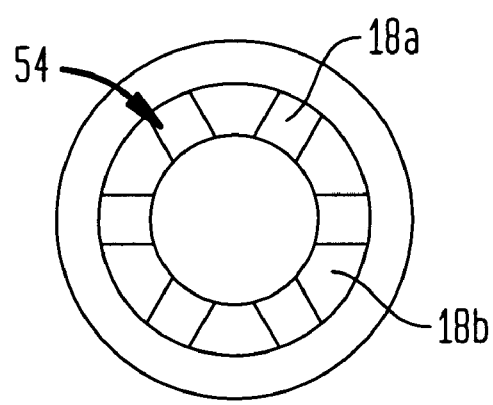
FIG. 4 is a plan view of the bottom surface of the preferred fuel inlet connector shown in FIG. 1.

In addition, as shown in FIG. 4, radial slots in the form of recessed surfaces 18a are provided in the lowermost surface of inlet connector 18 to reduce the effective contact surface area between the armature and the inlet connector by about one third of the total cross-sectional area which was utilized in prior art conventional injectors. This configuration provides six coined pads 18b of about 0.05 mm in height, thus creating six corresponding rectangular shaped radial slots 18a to provide fuel flow paths. By reducing, the effective surface area of the lowermost face of the inlet connector 18 as shown, the tendency to develop an attractive force between the inlet connector 18 and the armature 14 is significantly reduced to about one-third of its original value, and the ability to tolerate fuel contaminants at the interface without producing an attractive force therebetween is also significantly increased. As noted, preferably, the rectangular radial slots 18a are of a shallow depth, i.e. about 0.05 mm, (i.e., millimeters) in order to provide the benefit of reducing the inlet connector/armature interface surface area while still providing a relatively unobtrusive location for collection of solid contaminants which are ultimately removed by the flow of gaseous CNG.

As noted, the provision of recessed surfaces 14a in the lowermost surface of inlet connector 18 creates raised pads 18b on the surface, which pads improve the tolerance of the injector to fuel contaminants in several ways. The recessed surfaces 18a may be made by any suitable process, but are preferably coined. The first effect is to reduce the contact area of the inlet connector at the armature interface, thereby significantly reducing any attractive force generated therebetween by liquid contaminants such as oil or water. Furthermore, as noted, the radial pads 18b provide hidden areas between the pads where contaminants can collect without affecting the operative working gap 15 until being drawn away by the fuel flow. The working gap for gasoline is about 0.08 mm to about 0.14 mm, and about 0.3 mm for compressed natural gas. In addition, as noted, the provision of the six rectangular recessed portions in the form of slots 18a and six raised pads 18b, each having a generally trapezoidal shape, on the inlet connector, provide a unique fuel flow path past the inlet connector/armature interface in a manner which causes the gaseous fuel to pass transversely through the working gap 15 as shown at 56 in FIG. 5 and allow for the control of the fuel flow around and through the armature by controlling the pressure losses.

Also, by controlling the sizes of the recessed surfaces 18a and raised pads 18b, and the various apertures 58, 60, 66 in the armature and the valve body as will be described—as well as the numbers and combinations of such openings—the fuel flow can be controlled over at least three flow paths and pressure losses can also be controlled. For example, a small pressure differential across the armature while fully open, assists spring 30 during breakaway upon closing and provides dampening on opening impact. The additional fuel flow path also reduces the possibility of contaminants collecting above upper guide 36 as shown in FIG. 2. In summary, numerous combinations of apertures and sizes thereof—as well as slots and pads on the fuel inlet connector—can be made to direct the gaseous fuel flow in any desired manner which is best for optimum fuel burning and engine application.

Figure 5:
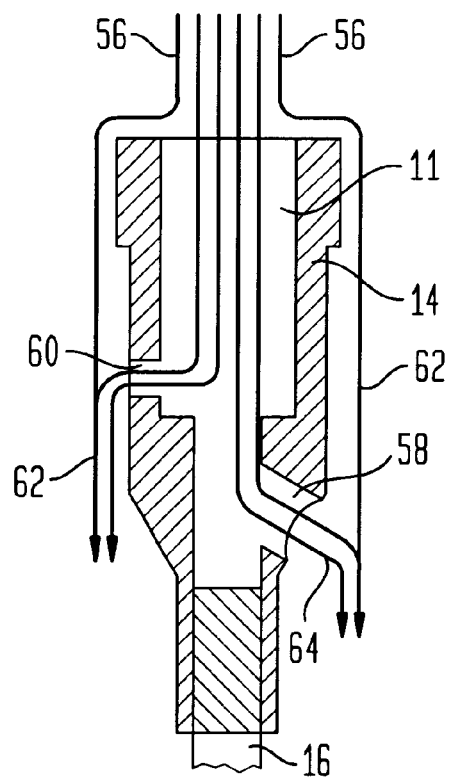
FIG. 5 is an elevational cross-sectional view of a preferred embodiment of the armature shown in FIG. 1 and illustrating the improved fuel flow paths resulting therefrom.
Figure 6:
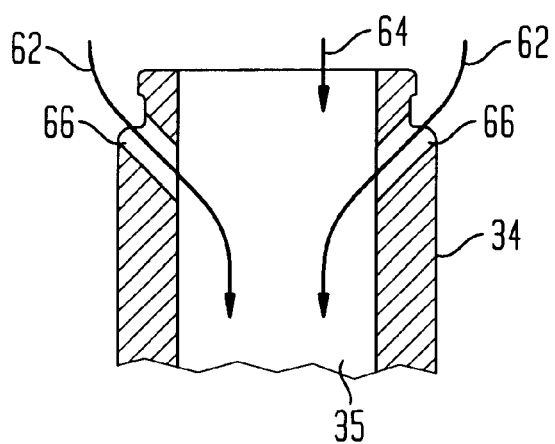
FIG. 6 is an elevational cross-sectional view of the upper portion of a preferred embodiment of the valve body shown in FIG. 1.

Referring now to FIGS. 5 and 6 in conjunction with FIGS. 1–3, there is illustrated still another significant improvement, which renders the fuel injector assembly more fully capable of operation with CNG. In prior art injectors which were used with relatively contaminant free fuels the fuel would pass through the filter down through the inlet connector into the armature and out an opening positioned relatively close to the lowest portion of the armature which was located substantially immediately above the valve aperture. In the present structure there is provided a relatively diagonally oriented aperture 58 shown in FIG. 5, which directs the CNG flow therethrough and downwardly toward valve aperture 41 for entry into the intake manifold of the internal combustion engine.

As shown in FIG. 5, aperture 58 forms a generally acute angle with longitudinal axis A—A of the fuel injector 10. In addition, the armature of the present invention provides at least one side opening 60 which is generally transverse to the longitudinal axis A—A, to permit fuel flowing downwardly through the center of the armature to be directed sidewardly out of the armature and thereafter downwardly toward the valve aperture 41 shown in FIG. 1. In the embodiment shown in FIG. 1, aperture 60 is generally horizontal, but may be oriented at an acute angle to the longitudinal axis if desired. Aperture 58 is not shown in the cross-sectional view of FIG. 1. The fuel flowing through aperture 60 is indicated by the flow lines 62 and the fuel flowing through aperture 58 is indicated schematically by flow lines 64. Optionally several additional horizontal apertures 60 may be provided in the armature at different radial locations thereabout, or alternatively as shown, one aperture 60 may be provided, depending upon the fuel flow pattern sought in each particular instance. It can be seen that the fuel flow from the fuel inlet connector 18 is divided into three paths, a first path expanding across working gap 15, a second path through aperture(s) 60, and a third path through aperture(s) 58. The first path extends between the armature 14 and the magnetic coil 28 and is ultimately joined by the second flow path passing through aperture(s) 60.

It can also be readily appreciated that the diameters of each aperture 58, 60 can be varied to direct the fuel flow in any predetermined desired direction. For example, by reducing the size of apertures 58,60 fuel will be encouraged to flow with increased volume cross the working gap 15. Alternatively, increasing the diameter of apertures 58, 60 will attract greater volume of fuel through those apertures and thereby reduce the fuel flow across the working gap. It has also been found that the diameters of the apertures 58, 60 and the numbers and locations of such apertures affect the damping characteristics of the valve needle 16, both upon opening and upon closing. Accordingly, the diameter of fuel flow apertures 58, 60 and the numbers, locations, and orientations of such apertures will depend upon the desired volumetric flow characteristics and desired flow patterns in each instance; however diameters within the range of 1–2 mm have been found to be preferable.

Referring now to FIG. 6, a valve body 34 is also provided with central fuel flow opening 35 and several diagonally oriented fuel path apertures 66 which are intended to receive the CNG fuel flowing from the first and second flow paths from the working gap 15 and aperture(s) 60 along the sides of the armature 14 and to redirect the fuel downwardly toward the valve aperture 41 such that when the needle 16 is lifted, the fuel is permitted to enter aperture 41 and thereafter directed into the intake manifold of the engine, neither of which are shown in the drawings. Fuel flowing along the third flow path through aperture(s) 58 lead directly toward aperture 41. It has been found that the unique provisions of the apertures 58 and 60—as well as rectangular radial slots 18a on the inlet connector lowermost face— create a fuel flow pattern which induces the CNG to flow in the manner shown by the fuel flow lines at 56, 62 and 64 in FIG. 5 and such fuel flow lines actually create ideal pressure conditions to avoid causing the armature to be attracted to the inlet connector. Thus the attractive forces between the armature and inlet connector are minimized by the several factors mentioned, namely the elimination of the tendency of the oil and contaminates to accumulate in the space 15 located between the armature and the inlet connector, the reduction of the effective inlet connector/armature interface area by provision of radial pads on the face of the inlet connector, and the provision of the unique CNG flow pattern which creates a force free environment between the inlet connector and the armature.

As indicated, alternatively, apertures 60 may be provided in several locations about the circumference of the armature, and apertures 58 may be provided in several locations thereabout. Also their angular orientations may be varied. However, it has been found that a single aperture on each side, as shown is sufficient to produce the desired flow path and the force free environment. Also, as noted, it should be noted that the diameter of each aperture can be altered in order to provide control of the fuel pressures and flow patterns in the areas surrounding the inlet connector, the armature, and the valve body, so as to provide a predetermined fuel flow pattern throughout the injector as may be desired. This feature is more fully disclosed in the aforementioned commonly assigned, commonly filed (Attorney Docket No. 99P7610US) copending application entitled Compressed Natural Gas Injector Having Gaseous Damping for Armature Needle Assembly During Opening.

It should also be noted that the presence of the diagonally oriented fuel flow apertures 66 in valve body 34 eliminates the problems of prior art injectors wherein debris and contaminants would accumulate in the area of the upper valve guide 36, causing abrasive action and intermittent guidance between the upper guide 36 and the armature 14. Thus, the provision of the diagonally oriented apertures 66 in valve body 34 encourage the flow of CNG past the area surrounding the upper guide 36 and eliminate any accumulation tendencies for contaminants in the area of upper guide 36.

Figure 7:
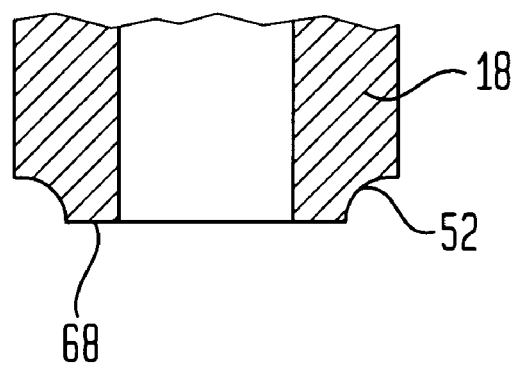
FIG. 7 is a partial elevational cross-sectional view of the lower end portion of an alternative embodiment of the fuel inlet connector shown in FIG. 3.
Figure 8:
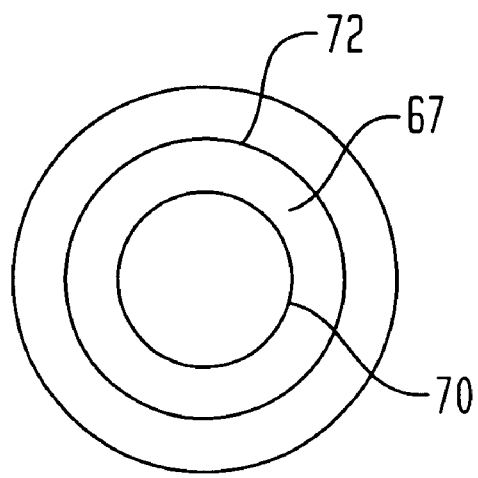
FIG. 8 is a plan view of the bottom surface of the fuel inlet connector shown in FIG. 7.

Referring now to FIGS. 7 and 8 in conjunction with FIGS. 1–3, there is illustrated an alternative embodiment of the lower end portion of the inlet connector 18 and the lowermost face of the inlet connector 18. In this embodiment inlet connector 18 includes arcuately chamfered surface 52 on the lowermost end of inlet connector 18 as in the previous embodiment. In FIG. 8, the lowermost surface of inlet connector 18 defines a surface area 67 between concentric circles 70 and 72 as shown. While the inlet connector/armature contact area is not reduced as in the embodiment of FIGS. 3 and 4, the operation of the injector is improved over the prior art injectors. Accordingly, the alternative embodiment as shown in FIGS. 7 and 8 will provide substantially improved operation for the injector as shown as compared with prior art injectors when utilized with CNG.

Figure 9:
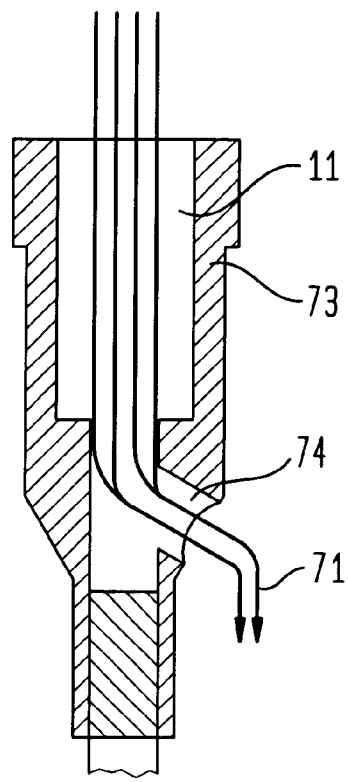
FIG. 9 is an elevational cross-sectional view of an alternative embodiment of the armature shown in FIG. 5.
Figure 10:
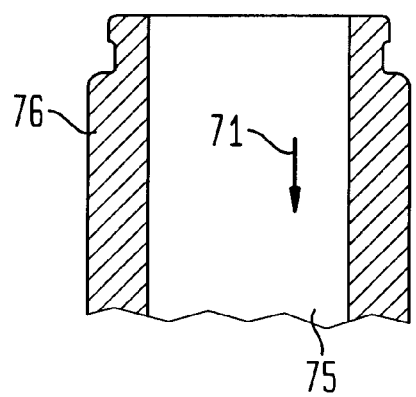
FIG. 10 is an elevational cross-sectional view of the upper portion of an alternative embodiment of the valve body shown in FIG. 6.

Referring to FIGS. 9 and 10 in conjunction with FIGS. 1–3, there is shown still another alternative embodiment of the armature configuration for use with CNG the armature in valve assembly configuration for use with CNG. In FIG. 9 the armature assembly 73 contains a diagonally shaped relatively large fuel flow opening 74 at the lower portion thereof, while the horizontal fuel opening 60 in the armature of FIG. 5 has been eliminated. In addition, in the valve body 76 shown in FIG. 10, central flow opening 75 is provided, and the diagonal fuel flow openings 66 of the embodiment of FIG. 6 have been eliminated and the fuel flow as depicted at 71 in FIG. 10 will therefore be directed out of diagonal aperture 74 and into valve assembly 76 as shown in FIGS. 9 and 10.

The CNG fuel path created by the combination of the inlet connector and armature shown in FIGS. 7–10 represents a significant improvement over prior art structures. However, the armature and valve assembly shown in FIGS. 3–6 are preferred. It should be noted that the structures disclosed in FIGS. 7–10 produce satisfactory and improved operation and may alternatively be considered to be a preferred embodiment, depending upon the particular environment in which they are utilized. For example, in certain injectors dimensional and clearance considerations may very well create a flow pattern which will mandate a preference to utilizing the embodiments of FIGS. 7–10 as opposed to the previously disclosed embodiments of FIGS. 3–6.

Figure 11:
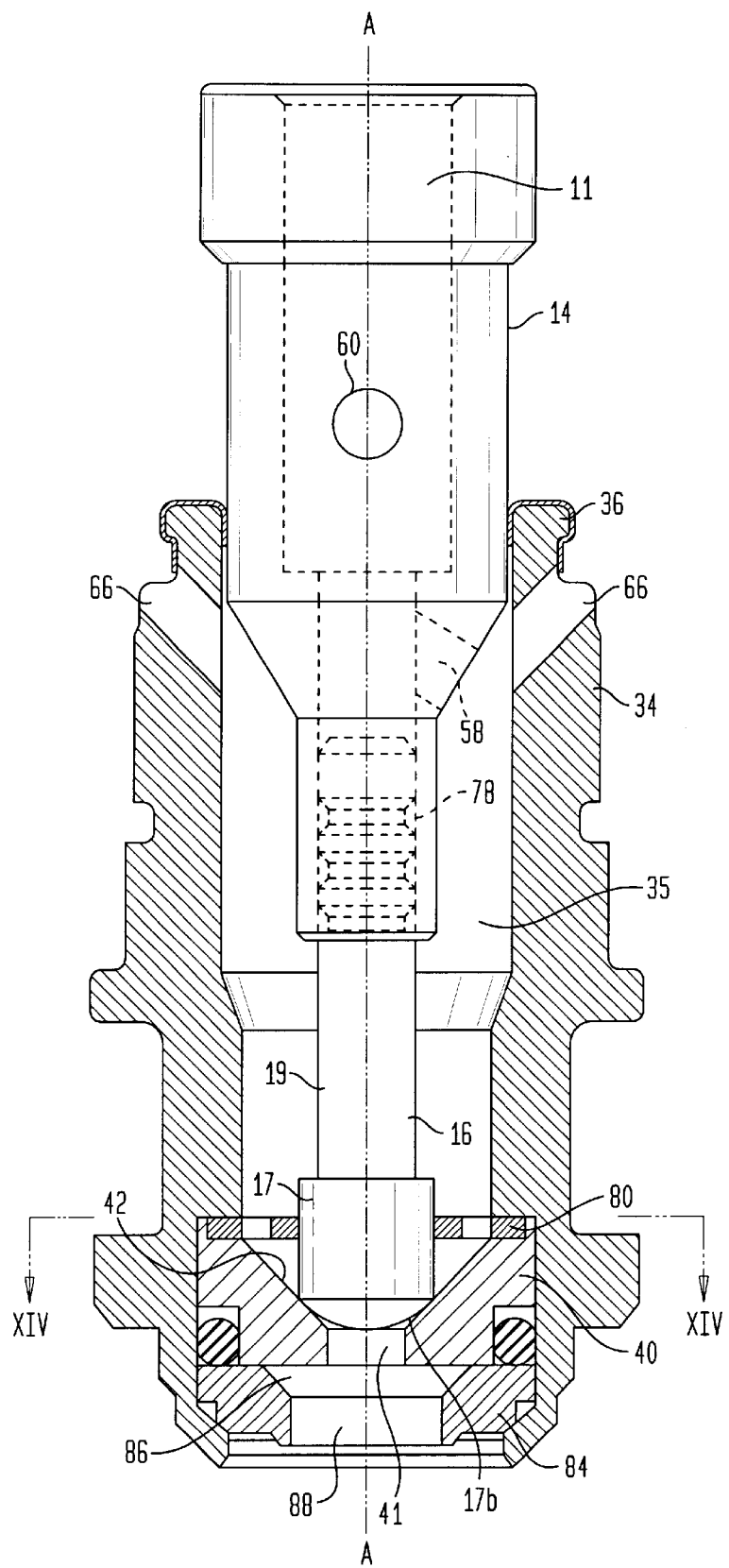
FIG. 11 is an enlarged elevational view of the armature shown in FIG. 5 and a cross-sectional view of the valve body shown in FIG. 6, incorporating an improved valve needle a fuel columnating jet flow device.
Figure 12:
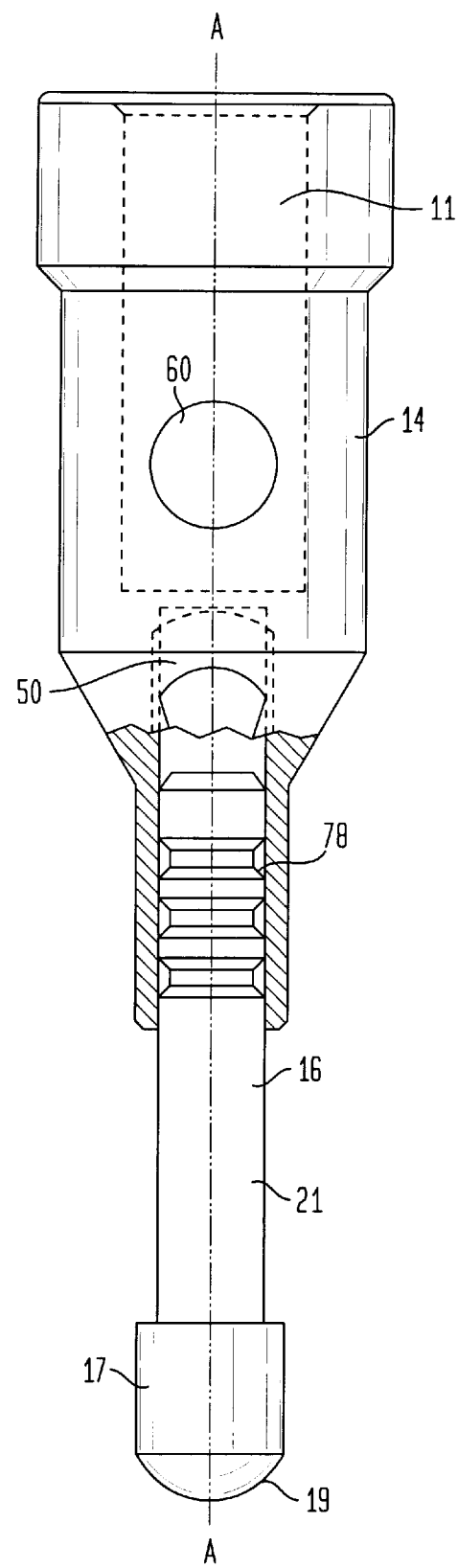
FIG. 12 is an enlarged elevational view, partially in cross-section, of the armature shown in FIG. 5, and the improved valve needle shown in FIG. 11.

Referring now to FIGS. 11 and 12 in conjunction with FIGS. 1–3, there is disclosed an enlarged elevational view of the improved armature of the present invention, the improved valve body of the present invention, and the improved valve needle which has been incorporated into the disclosed structure. In particular, the armature 14 contains side fuel flow aperture(s) 60 and the valve body 34 contains the diagonal CNG fuel flow path openings 66. The armature 14 has attached thereto by a known crimping procedure at 78, an improved valve needle 16.

The improved valve components of the present fuel injector are disclosed in FIGS. 1, 11 and 12 incorporating the improved needle 16. During operation of the fuel injector, the armature 14 moves upwardly and downwardly due to the energization and deenergization of coil 30 so as to produce alternating opening and closing contact between valve needle 16 and valve seat 40. As the needle is raised to permit the CNG fuel flow through the aperture 41 the flow passes the tip portion 17 of the needle and enters aperture 41 in its flow path toward the intake manifold of the engine.

In conventional liquid fuel injection systems having a conventional elongated needle having a continuous cylindrically shaped outer surface, the needle presents several problems and disadvantages. When applied to CNG systems, the problems inherent with conventional needles are intensified, particularly due to the changes in the gaseous environment as compared to the liquid environment. Accordingly, the present invention incorporates a novel valve needle which improves the operation characteristics of fuel injection systems, including liquid fuel and gaseous fuel types.

It has been known that when conventional valve needles engage a valve seat of a fuel injector the force of impact with conventional needles can generate sounds within the engine compartment which are generally perceived as either a mechanical problem or otherwise harsh or objectional noises emanating from the engine. This force of impact—which is equal to the valve component mass multiplied by the acceleration—is generally caused by the relatively substantial velocity of the needle during its movement toward the "valve closed" position in engagement with the valve seat. Accordingly, the needle 16 which forms part of the present injection system, has been structured to eliminate disadvantages of prior art needles. Although this needle has been found to improve performance with gaseous fuel injection systems as in the present invention, it has also been found to improve the performance of liquid fuel injection systems.

With the improved needle shown in FIG. 11, it has been found that it is desirable to provide a generous radius sealing portion 19 at the valve end of the needle in order to maximize the contact area between the valve needle 16 and the valve seat 40. For example, the greater the radius at the tip of the needle, the better the sealing between the needle and the valve seat 40. Preferably, the radius of the spherical sealing section 19 of needle 16 is in the order of about 1.75 millimeters (i.e., mm), or about 1.5 times the radius of the corresponding sealing surfaces in the prior art structures. However, needles which are generally known for conventional injectors of the type disclosed herein generally have a continuous outer cylindrical configuration from the upper end to the lower end, thus requiring a needle of relatively large needle cross-sectional area in order to provide a relatively large sealing surface. The needle 16 of the present invention as shown in FIG. 11 is a relatively low mass needle as disclosed, yet includes a relatively large spherical sealing surface.

In particular, the mass of the needle has been substantially reduced by reducing the cross-sectional dimension of the shaft 21 of the needle and retaining a tip portion 17 which is greater in cross-sectional dimension then the shaft of the needle as shown. This configuration effectively reduces the mass of the needle while retaining the relatively large sealing diameter of spherical surface 17b of the tip portion 17 so as to provide a relatively generous radius at the tip—or free end—portion of the needle for engagement with the valve seat 40. It has been found that the relatively reduced mass of the needle and the relatively large radius of the tip portion 17 makes it possible to provide a generous spherical sealing surface 19 for the needle for a given amount of CNG flow. The generous radius also results in a shorter traveling distance for the needle 16 thereby reducing the impact velocity of the needle relative to the valve seat. It has been determined that for a predetermined flow rate, this configuration results in a significant reduction of the noise produced by the impact between the needle 16 and the valve seat 40. Furthermore, the attenuation of the apparent noise is a result of reducing the amplitude (via reduction of lift of the needle 16) and lowering the frequency (via the greater impact radius of tip portion 17) of the noise into a less objectionable region of the sound spectrum as perceived by the human ear.

In addition to reduced noise, the improved needle of the present invention provides a larger guide surface relative to the mean needle diameter, thereby improving the wear resistance of the guiding surface of lower guide 80 shown in FIG. 11. This improved wear resistance of the guide surface is due to the reduced loading compared to that of a conventional base valve guide diameter which was used with needles of the prior art. For example, a typical prior art needle will have a substantially continuous cylindrically shaped shaft which terminates at a radiussed end portion wherein the shaft diameter may be twice as much as the diameter of the shaft of the improved needle shown in FIG. 11. On the other hand, the tip portion 17 of the needle shown in FIG. 11 can be configured to have a diameter up to approximately 50% greater than the diameter of the shaft 19 of needle 16 thereby having a greater diameter than would otherwise be present in a prior art needle and thereby making provision for a lower guide 80 having a guide surface which is greater in diameter and surface area than would otherwise be utilized with prior art needles. This improves the wear resistance of the guide surface due to the reduced loading as compared to that of the conventional base valve guide diameter. Significant features of the needle disclosed herein are also disclosed in commonly assigned, commonly filed (Attorney Docket No. 98P7678US01) application entitled "Compressed Needle Gas Injector Having Improved Low Noise Valve Needle," the disclosure of which is incorporated herein by reference.

Figure 13:
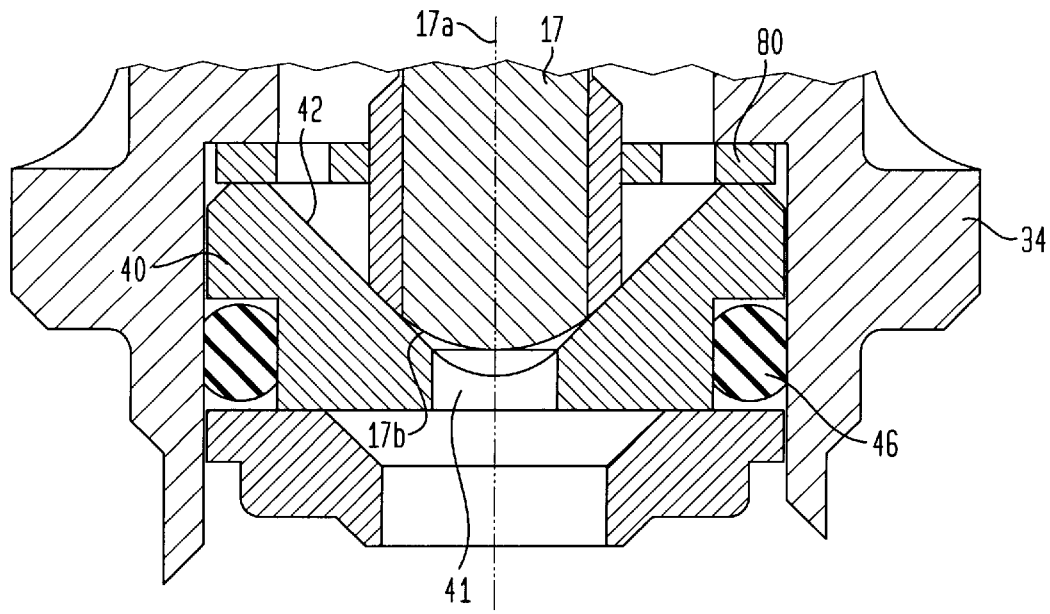
FIG. 13 is an enlarged cross-sectional view illustrating the sealing tip portion of the valve needle as seated on the fixed valve seat as shown in FIGS. 1 and 11, illustrating the preferred dimensional relationship between the needle tip, the fixed valve seat and the lower needle guide.
Figure 14:
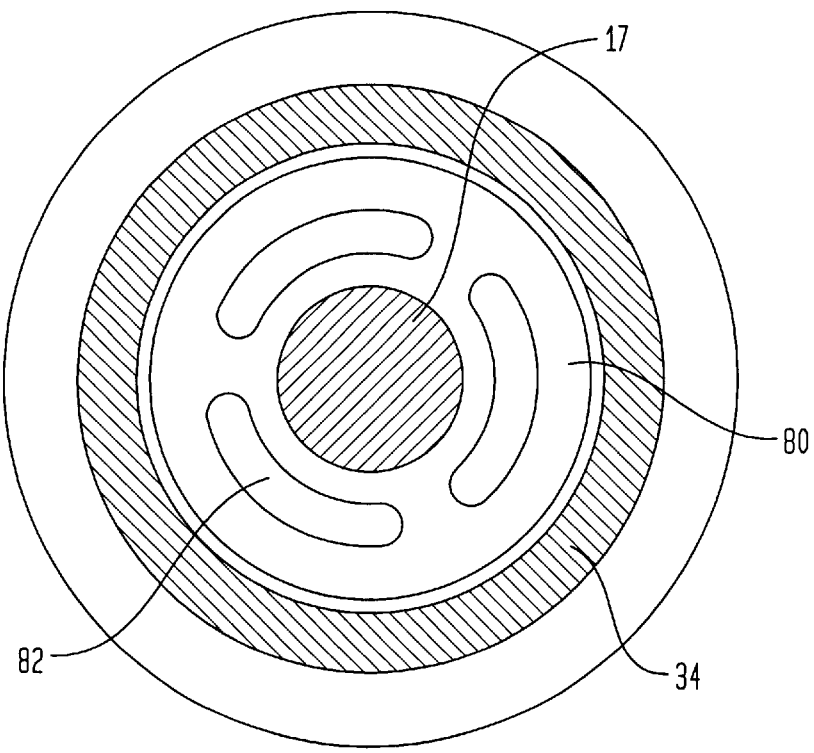
FIG. 14 is a view taken along lines 14—14 of FIG. 11, illustrating a preferred valve needle lower guide having arcuately shaped fuel passage openings.

In FIG. 13, the preferred dimensional relationship between the improved needle 16 and the funnel shaped valve needle rest 42 is shown in greater detail. As noted with respect to FIG. 1, needle 16 includes a central shaft portion and a cylindrical needle tip portion 17 having a spherical lower surface 17b which engages the frusto-conically shaped surface 42 of needle rest 40. The needle is guided by upper guide 36 guiding armature 16 as shown in FIG. 1, and lower guide 80 guiding needle tip portion 17 as shown in FIGS. 13 and 14. Upper guide 36 is inherently required to provide a space 36a between the guiding surface and the armature 14, to permit the upward and downward motion of the armature and needle. Thus the armature 14 and needle 16 may have the tendency to shift to the left or right at the upper guide 36 within space 36a which is about 0.10 to about 0.15 mm on the diameter, preferably about 0.13 mm.

Referring now to FIG. 13, it has been found to be advantageous to locate the center of generation 17c of spherical sealing surface 17b of needle tip portion 17 at the center of the lowermost surface of lower guide 80 as shown, in order to assure precise seating and sealing of needle 16 on frusto-conical needle rest 42. In particular, by such positioning of the center 17c of spherical sealing surface 17b of tip portion 17, the lower guide 80 tends to constrain sideward movement of the needle tip portion 17 due to movement of armature 16 within upper guide 36, and effectively becomes a nodal point about which needle tip portion 17 is capable of rotating over 360 degrees of motion. Thus any sideward movement of the needle which occurs at the level of armature 14 and upper guide 36, will cause the needle to pivot about the center point 17c and promote self seating of sealing surface 17b on needle rest 40. This self-seating feature also applies in the event that any misalignment or manufacturing tolerance buildup occurs in the relationship between upper guide 36 and needle 16.

As noted, the present needle 16 is advantageous for use with injectors, which utilize CNG as is contemplated herein, as well as with injectors which utilize liquid fuels, such as gasoline. In particular, in injectors utilizing liquid fuels, the motion of the valve needle is also damped by displacement of fluid across the extended valve seal face and the valve seat which further reduces the impact force and uncontrolled secondary injections upon closure caused by the valve needle when it rebounds away from the valve seat. In such injectors used with liquid fuels, valve rebound produces quantities of low velocity fuel droplets after the needle started to close. Valve rebound dampening minimizes low volume/velocity fuel transfer to the aperture 41. Thus, the dampening of the needle rebound improves the operation of the injector by minimizing low volume/low velocity fuel transfer to the orifice and the surrounding area which tends to extendedly suspend fuel droplets via surface tension when liquid fuels are used. Valve rebound dampening has also been found to be beneficial in the present injector which is contemplated for use with gaseous CNG.

Referring now to FIG. 14, in conjunction with FIG. 11, lower valve needle guide 80 is illustrated in the form of a disc shaped member having arcuately shaped fuel passage apertures 82 which direct the gaseous CNG in a more efficient and effective manner as compared to prior art valve guides which utilized a plurality of circular openings formed along a circular pattern. The apertures 82 are larger than the prior art circular apertures and are more effective in directing and controlling the fuel flow in an efficient manner by forming the flow pattern into several arcuate flow paths.

Referring now to FIG. 12, the improved armature 14 is illustrated with valve needle 16 crimped thereto at 78 by known crimping procedures; however, valve body 34 has been eliminated for purposes of clarity of illustration in the enlarged view of armature 14 and needle 16. In FIG. 12, the illustration of needle 16 clearly shows the main shaft portion 21 and the enlarged tip portion 17 with enlarged valve spherical sealing surface 17b which conveniently engages and disengages seat area 42 of valve needle rest 40 as described in conjunction with FIG. 13.

Referring again to FIG. 11, the injector 10 incorporates a fuel columnating jet device 84 which includes a shallow funnel shaped section 86 connected to a generally tubular shaped columnating section 88. Gaseous fuel passing through valve aperture 41 is then allowed to pass through funnel shaped section 86, and then to be columnated into a steady gaseous stream in columnating section 88. The fuel columnating device 88 enhances mixture quality, reduces fuel delivery time and enables single or multiple discharge orientation for improved gaseous flow targeting. A narrow gaseous flow discharge angle can entrain the surrounding working fluid (mostly air) and can impart useful turbulent energies to directed air/fuel mixtures flowing through a port, intake valve and/or into a combustion chamber to reduce in-cylinder air/fuel mixture gradients. This feature has proven to significantly reduce engine misfire and to improve exhaust emissions, and is also disclosed in commonly assigned, commonly filed (Attorney Docket No. 99P7611US) application entitled "Gaseous Injector With Columnated Jet Orifice and or Flow Directing Device," the disclosure of which is incorporated herein by reference.

It has been found that the injector of the present invention provides improved operation for the reasons stated hereinabove by improving the flow pattern of the CNG as described, improving the control over the valve needle operation and movements thereof, and improving the sealing characteristics of the needle type valve incorporated as part of the injector. As noted hereinabove, noise characteristics and needle dampening both upon opening and upon closing, have been significantly improved by the present invention and with the result that the injector as shown and described is significantly improved for use with compressed natural gas (CNG) fuels.

Although the present invention is particularly intended for use with CNG fuels, it is self evident that the use of any liquid or gaseous fuels are contemplated, particular those fuels which are relatively high in contamination, since the tolerance of the contaminants has been fully addressed by the disclosed structures.

Although the invention has been described in detail with reference to the illustrated preferred embodiments, variations and modifications may be provided within the scope and spirit of the invention as described and as defined by the following claims.

What is claimed is:

1. An electromagnetically operable fuel injector for a gaseous fuel injection system of an internal combustion engine, said injector having a generally longitudinal axis, which comprises:

a) a ferromagnetic core;

b) a magnetic coil at least partially surrounding the ferromagnetic core;

c) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said armature having a generally elongated shape and a generally central opening for axial reception and passage of gaseous fuel from a fuel inlet connector positioned adjacent thereto, said fuel inlet connector and said armature being adapted to permit a first flow path of gaseous fuel between said armature and said magnetic coil as part of a path leading to said fuel valve; and d) at least one first fuel flow aperture extending through a wall portion of said armature to define a second flow path of gaseous fuel as part of a path leading to said fuel valve, wherein said armature defines at least one second aperture in a wall portion thereof to define a third flow path of gaseous fuel as part of a path leading to said fuel valve, and wherein said at least one-second aperture is oriented at a generally acute angle with respect to the longitudinal axis.

2. The electromagnetically operable fuel injector according to claim 1, wherein said fuel inlet connector and said armature are spaced to define a working gap therebetween and are adapted to permit said first flow path of gaseous fuel within said working gap.

3. The electromagnetically operable fuel injector according to claim 1, further comprising a valve body positioned downstream of said armature and having at least one aperture in a wall portion thereof for reception of fuel from at least two of said flow paths of gaseous fuel from said armature and said fuel inlet connector.

4. The electromagnetically operable fuel injector according to claim 3, further comprising a valve body shell at least partially surrounding said armature and said valve body, said valve body shell defining a radial space with said armature for passage of said first flow path of gaseous fuel between said armature and said valve body shell.

5. The electromagnetically operable fuel injector according to claim 4, wherein said fuel inlet connector is positioned above said armature and is spaced from said armature by a working gap, said fuel inlet connector defining a through passage for directing fuel toward said armature and said fixed valve seat.

6. The electromagnetically operable fuel injector according to claim 5, wherein said fuel inlet connector comprises an upper end portion adapted for reception of gaseous fuel from a fuel source, and a lower end portion for discharging gaseous fuel, said lower end portion having a lower surface which faces an upper surface of said armature, said lower surface of said fuel inlet connector having a plurality of radially extending raised pads defined thereon, said pads having recessed portions therebetween to permit fuel to flow therethrough and across said working gap defined between said fuel inlet connector and said armature.

7. An electromagnetically operable fuel injector for a compressed natural gas fuel injection system of an internal combustion engine, said injector having a generally longitudinal axis, which comprises:

a) a ferromagnetic core;

b) a magnetic coil at least partially surrounding said ferromagnetic core;

c) an armature coupled to said magnetic coil and movably responsive to said magnetic coil, said armature having a first upper end face and a lower end portion;

d) a valve closing element connected to said lower end portion of said armature and interactive with a fixed valve seat to selectively permit fuel to pass through said valve seat as said valve closing element is moved to a valve open position by said armature;

e) a fuel inlet connector extending in a generally longitudinal direction above said armature and defining a path for fuel to enter said inlet connector and to be directed toward said armature, said fuel inlet connector having a lowermost end portion having a lowermost surface spaced above said armature to define a working gap through which said armature is movable; and f) said armature having a fuel reception portion for receiving fuel directed from said fuel inlet connector, said armature further defining a generally axial fuel passage and at least a first fuel flow aperture extending through a wall portion thereof for directing fuel from said fuel inlet connector through said generally axial fuel passage and into said aperture toward said fixed valve seat for entry into an air intake manifold for the engine, said fuel flow aperture being oriented generally transverse to said longitudinal axis, wherein said armature further defines at least a second fuel flow aperture extending through a lower portion thereof and oriented at an acute angle with said longitudinal axis, and positioned for directing fuel therethrough toward said fixed valve seat.

8. The electromagnetically operable fuel injector according to claim 7, wherein said lowermost surface of said fuel inlet connector and said armature are adapted to permit gaseous fuel to flow across said working gap and between said armature and said magnetic coil whereby at least three fuel flow paths are permitted.

9. The electromagnetically operable fuel injector according to claim 8, wherein said lowermost end portion of said fuel inlet connector has a generally chamfered configuration along the lowermost outer surface thereof.

10. The electromagnetically operable fuel injector according to claim 9, wherein said generally chamfered portion of said fuel inlet connector has a generally arcuate cross-section.

11. The electromagnetically operable fuel injector according to claim 10, wherein said valve closing element is a valve needle adapted for selective engagement and disengagement with said fixed valve seat.

12. The electromagnetically operable fuel injector according to claim 11, wherein said valve needle is attached to said armature by crimped portions of said armature.

13. The electromagnetically operable fuel injector according to claim 12, wherein a fuel filter is positioned at an upper end portion of said fuel inlet connector for filtering fuel prior to reception by said fuel inlet connector.

14. The electromagnetically operable valve according to claim 13, wherein said fuel inlet connector includes a lower surface portion having a plurality of radially extending grooves defining a corresponding plurality of radially extending raised pads so as to reduce the effective surface area of said lower surface portion of said fuel inlet connector facing said armature to thereby permit the gaseous fuel to flow generally transversely in said working gap, said transverse fuel flow thereby preventing accumulation of contaminants in said working gap.

15. The electromagnetically operable fuel injector according to claim 14, wherein said generally radially extending pads have a generally trapezoidal shape.

16. An electromagnetically operable fuel injector for an internal combustion engine, said injector defining a generally longitudinal axis, which comprises:

a) an outer housing;
b) a fuel inlet connector positioned in the upper end portion of said outer housing, said fuel inlet connector having an uppermost end portion for reception of fuel therein and a lowermost end portion for discharge of fuel therefrom:
c) an armature positioned below said fuel inlet connector and defining a generally axial elongated central opening to receive fuel flow from said fuel inlet connector, said armature having an uppermost end portion positioned below said lowermost end portion of said fuel inlet connector to define a working gap, and a lowermost end portion having a valve closing element positioned thereon for interaction with a fixed valve having a fixed valve seat associated with said housing to selectively permit fuel to flow through a valve aperture associated with said fixed valve seat when said armature is selectively moved upwardly toward said fuel inlet connector;
d) said fuel inlet connector having a lowermost end portion having a lowermost surface which faces said uppermost end portion of said armature, said lowermost end portion of said fuel inlet connector having a plurality of radially extending grooves separated by a corresponding plurality of radially extending raised pads to reduce the effective contact surface area between said inlet connector and said armature and to permit fuel to flow from said fuel inlet connector across said working gap;
e) a magnetic coil system for moving said armature and said valve closing element away from said fixed valve seat and toward said fuel inlet connector when said magnetic coil system is energized so as to permit fuel to flow through said fixed valve seat;
f) a resilient device to bias said armature and said valve closing element to move toward said fixed valve seat when said magnetic coil system is deenergized;
g) at least one first aperture extending through a wall portion of said armature for receiving fuel flow from said fuel inlet connector and directing said fuel flow from said generally elongated central opening of said armature toward said fixed valve seat, said at least one aperture being generally transverse to the longitudinal axis; and
h) at least one second aperture extending through a wall portion of said armature for receiving fuel flow from said fuel inlet connector and directing said fuel flow toward said fixed valve seat, said second aperture being oriented at a generally acute angle relative to the longitudinal axis for directing fuel from said generally central opening outwardly of said armature and downwardly toward said fixed valve seat.

17. The electromagnetically operable fuel injector according to claim 16, wherein said valve closing element is a generally elongated valve needle having a spherically shaped end portion and configured and adapted to engage a frusto-conically shaped fixed valve seat to close said valve, and movable therefrom to open said valve to permit fuel to pass therethrough toward the intake manifold of the internal combination engine.

18. The electromagnetically operable fuel injector according to claim 17, wherein said valve needle is connected to the lower end portion of said armature by crimped portions.

19. The electromagnetically operable fuel injector according to claim 18, wherein said resilient device is a coil spring in engagement at one end with said fuel inlet connector and at the other end with said armature to bias said armature downwardly toward said valve seat.

20. The electromagnetically operable fuel injector according to claim 19, wherein said armature includes at least two of said first apertures extending through wall portions thereof and generally transverse to the longitudinal axis for receiving fuel from said generally axial elongated central opening.

21. The electromagnetically operable fuel injector according to claim 20, wherein said armature defines a plurality of said first apertures for receiving fuel from said generally axial elongated central opening.

22. The electromagnetically operable fuel injector according to claim 21, wherein said armature defines at least a plurality of said second apertures, each said second apertures extending at a generally acute angle to the longitudinal axis to receive fuel from said generally central opening.

23. A method of directing gaseous fuel through air electromagnetically operable fuel injector for a fuel system of an internal combustion engine, said injector having a generally longitudinal axis, and including a fuel inlet end portion and a fuel outlet end portion, a fuel inlet connector positioned at said fuel inlet end portion and having a fuel inlet end portion and a fuel outlet end portion, an armature positioned adjacent said fuel outlet end portion of said fuel inlet connector and having a generally central elongated opening for reception of fuel from said fuel inlet connector, said armature being spaced from said fuel inlet connector to define a working gap to permit movement of said armature toward and away from said fuel inlet connector to selectively open and close a fuel valve to permit gaseous fuel to pass therethrough to an air intake manifold, comprising:

a) directing the gaseous fuel to pass axially through said fuel inlet connector;

b) directing the gaseous fuel to pass from said fuel inlet connector to said generally elongated central opening of said armature in an axial direction toward said fuel valve;

c) directing at least a portion of the fuel flow from said fuel inlet connector to said armature to flow generally transversely across said working gap; and d) diverting at least a portion of the flow of gaseous fuel passing through said armature to flow in a direction away from said axial direction by directing the gaseous fuel through at least one first aperture provided in a wall portion of said armature, wherein said aperture in said portion of said armature extends generally transverse to said axial direction, wherein a lower end portion of said fuel inlet connector facing an upper end portion of said armature is configured to permit said gaseous fuel to flow from said fuel inlet connector to be directed transversely across said working gap, and wherein at least a portion of the gaseous fuel flowing in said armature is permitted to pass through at least one second aperture in a lower wall portion thereof, said at least one second aperture extending at an acute angle to said longitudinal axis, whereby at least three separate fuel flow paths are established.

24. The method according to claim 23, wherein said injector comprises a magnetic coil system having a magnetic coil, and said armature is magnetically coupled to said magnetic coil system to cause said armature to move toward and away from said fuel inlet connector, at least one of said fuel flow paths being located between said armature and said magnetic coil.

25. A method of directing compressed natural gas through an electromagnetically operable fuel injector for a fuel system of an internal combustion engine, said injector having a generally longitudinal axis, and including a fuel inlet end portion and a fuel outlet end portion, a fuel inlet connector positioned at said fuel inlet end portion, and an armature positioned adjacent said fuel inlet connector and said fuel outlet end portion of said injector, said armature being spaced from said fuel inlet connector to define a working gap to permit movement of said armature toward and away from said fuel inlet connector, said armature having a generally axial fuel passage opening and having attached thereto a valve needle having an end portion adapted to selectively disengage and engage a fuel valve to open and close said valve to permit gaseous fuel to pass therethrough, comprising:

a) directing the gaseous fuel through said fuel inlet connector;

b) directing the gaseous fuel to pass from said fuel inlet connector to said fuel passage opening of said armature in an axial direction toward said fuel valve;

c) directing at least a portion of the flow of gaseous fuel passing through said armature to flow through at least one first aperture in a wall portion of said armature, said aperture extending in a direction generally transverse to said axial direction;

d) directing at least a portion of the flow of gaseous fuel passing through said armature to flow in a direction at an acute angle to said axial direction through at least one second aperture in a lower wall portion of said armature; and e) directing at least a portion of the flow of gaseous fuel passing from said fuel inlet connector to said armature to flow generally transverse to said axial direction across said working gap between said fuel inlet connector and said armature so as to establish at least three separate fuel flow paths between said fuel inlet portion and said fuel outlet portion of said injector.

26. The method according to claim 25, wherein said fuel inlet connector includes a plurality of adjacent raised pads on a lowermost end portion thereof, said raised pads being respectively spaced by adjacent recessed portions to permit the flow of gaseous fuel through said working gap when said armature moves toward said fuel inlet connector to thereby open said fuel valve.

27. The method according to claim 26, wherein said at least one first and second apertures in said armature are from about 1 to about 2.0 mm in diameter.

28. The method according to claim 27, wherein predetermined numbers of said first and second apertures are provided and the diameters thereof are predetermined to establish a predetermined number of fuel flow paths and volumetric flow rates thereof.

29. A method of directing fuel through an electromagnetically operable fuel injector for a fuel system of an internal combustion engine, said injector having a generally longitudinal axis, and including a fuel inlet end portion and a fuel outlet end portion, a fuel inlet connector positioned at said fuel inlet end portion, and an armature positioned adjacent said fuel inlet connector and said fuel outlet end portion of said injector, said armature being spaced from said fuel inlet connector to define a working gap to permit movement of said armature toward and away from said fuel inlet connector, said armature having a generally axial fuel passage opening for reception of fuel from said fuel inlet connector, and having attached thereto a valve needle having an end portion adapted to selectively disengage and engage a fuel valve to open and close said valve to permit fuel to pass therethrough, comprising:

a) directing the fuel through said fuel inlet connector;

b) directing the fuel to pass from said fuel inlet connector to said fuel passage opening of said armature in an axial direction toward said fuel valve;

c) directing at least a portion of the flow of fuel passing from said fuel inlet connector to said armature to flow generally transverse to said axial direction across said working gap between said fuel inlet connector and said armature so as to establish at least one separate fuel flow path outside of said armature;

d) directing at least a portion of the flow of fuel passing through said armature to flow at least along a second flow path through at least one first aperture in a wall portion of said armature, said aperture extending in a direction generally transverse to said axial direction; and e) directing at least a portion of the flow of fuel passing through said armature to flow at least along a third flow path it direction at an acute angle to said axial direction through at least one second aperture in a lower wall portion of said armature.

* * * * *